Patented Dec. 1, 1931

1,834,801

UNITED STATES PATENT OFFICE

CHARLES I. PHILLIPS AND MICHAEL J. CHRISTENSEN, OF CARNATION, WASHINGTON

WALL SPOT EFFACING COMPOUND

No Drawing.   Application filed September 17, 1929.   Serial No. 393,316.

This invention relates to improvements in stain removing compounds, particularly a compound for removing stains on calcimined surfaces preparatory to the performance of recalcimining operations.

The primary object of the present invention is to provide a compound which, by mixing with water to form a paint of suitable consistency, may be applied to a previously calcimined surface and will act to remove or cover any stains or spotted areas so that the same will not be apparent after the recalcimining of the walls is completed. In calcimining operations unless the surface to be finished or refinished is first made entirely free of spots, these spots will either show through the new calcimine applied to the wall or if they be caused by grease, the grease will come through the newly applied calcimine, making the same unsightly and spoiling the job. With the compound embodying the present invention any spots or grease stains will be entirely covered and concealed and the nature of the compound is such that grease will be absorbed and prevented from working out and through the applied calcimine.

The compound embodying the present invention consists of the following ingredients taken in the approximate proportions given:—

| | |
|---|---|
| Whiting | 3 lbs. |
| Powdered glue | ½ lb. |
| Corn starch | ¼ lb. |
| Lye | 6 ozs. |
| Alum | 6 ozs. |

The foregoing ingredients are thoroughly mixed in the dry state and distributed in this condition.

When the compound is to be used a sufficient amount of water is added to the same to make a paint which can be applied to a wall with a brush and the wall to be refinished is first given a thorough coating of the water mixture of the compound which is allowed to thoroughly dry thereon before the calcimining operation is begun.

While in the tabulated list of ingredients and in the claims the term "lye" has been used, it is to be understood that this refers only to the crude caustic alkali such, for example, as sodium or potassium hydroxide.

Having thus described our invention, what we claim is:—

1. A spot and stain effacing compound for walls consisting of the following ingredients taken in the following approximate proportions; whiting, three pounds; powdered glue, one-half pound; corn starch, one-quarter pound; lye, six ounces; alum, six ounces; and water, a sufficient quantity to make a mixture for application with a brush.

2. A spot and stain effacing compound for walls, consisting of the following ingredients; whiting, powdered glue, cornstarch, lye, alum, and water taken in sufficient quantity to make a liquid suitable for application with a brush.

In testimony whereof we hereunto affix our signatures.

CHARLES I. PHILLIPS.
MICHAEL J. CHRISTENSEN.